United States Patent
Liao et al.

(10) Patent No.: US 9,710,892 B2
(45) Date of Patent: Jul. 18, 2017

(54) IMAGE ENHANCEMENT METHOD AND IMAGE PROCESSING APPARATUS THEREOF

(71) Applicant: Chunghwa Picture Tubes, LTD., Taoyuan (TW)

(72) Inventors: Chia-Cheng Liao, Taichung (TW); Chun-Wei Su, New Taipei (TW)

(73) Assignee: Chunghwa Picture Tubes, LTD., Taoyuan (TW)

( * ) Notice: Subject to any disclaimer, the term of this patent is extended or adjusted under 35 U.S.C. 154(b) by 51 days.

(21) Appl. No.: 14/919,725

(22) Filed: Oct. 21, 2015

(65) Prior Publication Data

US 2017/0116712 A1    Apr. 27, 2017

(51) Int. Cl.
| | |
|---|---|
| *G06K 9/00* | (2006.01) |
| *G06T 5/00* | (2006.01) |
| *G06K 9/46* | (2006.01) |
| *G06T 7/00* | (2017.01) |
| *G06T 7/40* | (2017.01) |

(52) U.S. Cl.
CPC .............. *G06T 5/00* (2013.01); *G06K 9/4604* (2013.01); *G06K 9/4652* (2013.01); *G06K 9/4661* (2013.01); *G06T 7/0085* (2013.01); *G06T 7/408* (2013.01); *G06T 2207/20192* (2013.01)

(58) Field of Classification Search
CPC ........... G06T 2207/20192; G06T 5/002; G06T 5/003; G06T 7/0085; G06T 2207/10024
See application file for complete search history.

(56) References Cited

U.S. PATENT DOCUMENTS

| | | | | |
|---|---|---|---|---|
| 2009/0096897 A1* | 4/2009 | Saito | ..................... | G06T 7/0081 348/241 |
| 2011/0317073 A1* | 12/2011 | Chang | .................. | H04N 19/172 348/642 |
| 2014/0233826 A1* | 8/2014 | Agaian | ................ | A61B 5/7267 382/133 |
| 2014/0294319 A1* | 10/2014 | Yang | ....................... | G06T 5/003 382/266 |
| 2015/0310602 A1* | 10/2015 | Lee | ....................... | A61B 6/5258 382/132 |

FOREIGN PATENT DOCUMENTS

| | | |
|---|---|---|
| TW | 200726265 | 7/2007 |
| TW | 200933493 | 8/2009 |
| TW | 201423714 | 6/2014 |
| TW | I485690 | 5/2015 |

* cited by examiner

*Primary Examiner* — Li Liu
(74) *Attorney, Agent, or Firm* — Jianq Chyun IP Office

(57) ABSTRACT

An image enhancement method and an image processing apparatus thereof are provided. The image enhancement method is adapted to the image processing apparatus and includes the following steps. An input image is obtained, wherein the input image has a plurality of intensity components. The input image is corrected according to a gamma curve. The sharpness of the corrected input image is enhanced based on an edge detection operator and a weight value. An output image suitable for a display panel is obtained based on the enhanced input image.

10 Claims, 2 Drawing Sheets

IMAGE ENHANCEMENT METHOD AND IMAGE PROCESSING APPARATUS THEREOF

BACKGROUND

Field of the Invention

The invention relates to an image processing technique, and more particularly, relates to an image enhancement method for dehazing images and an image processing apparatus thereof.

Description of Related Art

In modern day, various types of display panels, such as the Liquid Crystal (LC) display panel, the Light-Emitting Diode (LED) display panel and the Organic Light-Emitting Diode (OLED) display panel, are already proposed and widely applied in electronic products for displaying images or videos. Nevertheless, the development of the display technology has never been stopped, and the display industry is further towards the development of the transparent display.

The transparent display panel may be configured by using polymer dispersed liquid crystal (PDLC) technology. Such transparent display panel can be switched electrically between the scattering state and the transparent state, and the light scattering property of the transparent display panel appeared in the scattering state is applied in displaying images. However, the light scattering property also brings the haze in the displayed images, leading to the blur on visual effect. Thereby, how to reduce the haze and to improve the display quality for the transparent display panel is still one of the major subjects for the people in the art.

SUMMARY

The invention is directed to an image enhancement method and an image processing apparatus thereof, in which the sharpness of the image is enhanced to achieve the dehazing effect, so as to improve the display quality of the display panel.

The invention proposes an image enhancement method, adapted to an image processing apparatus. The image enhancement method includes the following steps. An input image is obtained, wherein the input image has a plurality of intensity components. The input image is corrected according to a gamma curve, and the sharpness of the corrected input image is enhanced based on an edge detection operator and a weight value. An output image suitable for a display panel is obtained based on the enhanced input image.

In an embodiment of the invention, hue components and saturation components of the input image are adjusted to compensate the input image.

In an embodiment of the invention, the step of obtaining the input image further includes: receiving an original image; and performing a first color space conversion to the original image to obtain the input image, wherein each of pixels of the input image includes the hue component, the saturation component and the intensity component.

In an embodiment of the invention, the step of enhancing the sharpness of the corrected input image further includes: determining a type and a size of the edge detection operator and the weight value according to an image content of the corrected input image and an environmental factor; performing an edge detection process to the corrected input image by the edge detection operator to generate an edge image; improving the edge image according to the weight value; and overlaying the corrected input image with the improved edge image to enhance the sharpness of the corrected input image.

In an embodiment of the invention, the step of obtaining the output image based on the enhanced input image further includes: performing a second color space conversion to obtain the output image based on the intensity components of the enhanced input image, wherein each of the pixels of the output image includes a red component, a blue component and a green component.

The invention also proposes an image processing apparatus including an input unit, a gamma correction unit, a sharpness enhancement unit and an output unit. The input unit obtains an input image, wherein the input image has a plurality of intensity components. The gamma correction unit coupled to the input unit corrects the input image according to a gamma curve. The sharpness enhancement unit coupled to the gamma correction unit enhances the sharpness of the corrected input image based on an edge detection operator and a weight value. The output unit coupled to the sharpness enhancement unit obtains an output image suitable for a display panel based on the enhanced input image.

In an embodiment of the invention, the image processing apparatus further includes a color compensation unit. The color compensation unit coupled between the input unit and the output unit adjusts hue components and saturation components of the input image to compensate the input image.

In an embodiment of the invention, the input unit further includes a receive unit and a first color space conversion unit. The receive unit receives an original image. The first color component unit coupled to the receive unit performs a first color space conversion to the original image to obtain the input image, wherein each of pixels of the input image includes the hue component, the saturation component and the intensity component.

In an embodiment of the invention, the sharpness enhancement unit includes a control unit, an edge image generation unit, a weight unit and an overlay unit. The control unit determines a type and a size of the edge detection operator and the weight value according to an image content of the corrected input image and an environmental factor. The edge image generation unit coupled to the control unit performs an edge detection process to the corrected input image by the edge detection operator to generate an edge image. The weight unit coupled to the edge image generation unit and the control unit improves the edge image according to the weight value. The overlay unit coupled to the weight unit overlays the corrected input image with the improved edge image to enhance the sharpness of the corrected input image.

In an embodiment of the invention, the output unit includes a second color space conversion unit. The second color space conversion unit performs a second color space conversion to obtain the output image based on the intensity components of the enhanced input image, wherein each of the pixels of the output image includes a red component, a blue component and a green component.

Based on the above, in the image enhancement method and the image processing apparatus thereof provided in the present invention, the light intensity component of the input image is corrected according to the gamma curve and the sharpness of the corrected input image is further enhanced. The edge detection operator and the weight value are determined according to the image content and the environmental factor and applied in accurately enhancing the sharpness of the corrected input image. After the image enhancement, the output image suitable for the display panel is obtained based on the enhanced input image. Thus, the displayed image shown by the display panel is more vivid and has better recognizability, and the haze on the displayed image is reduced.

In order to make the aforementioned and other features and advantages of the invention more comprehensible, several embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
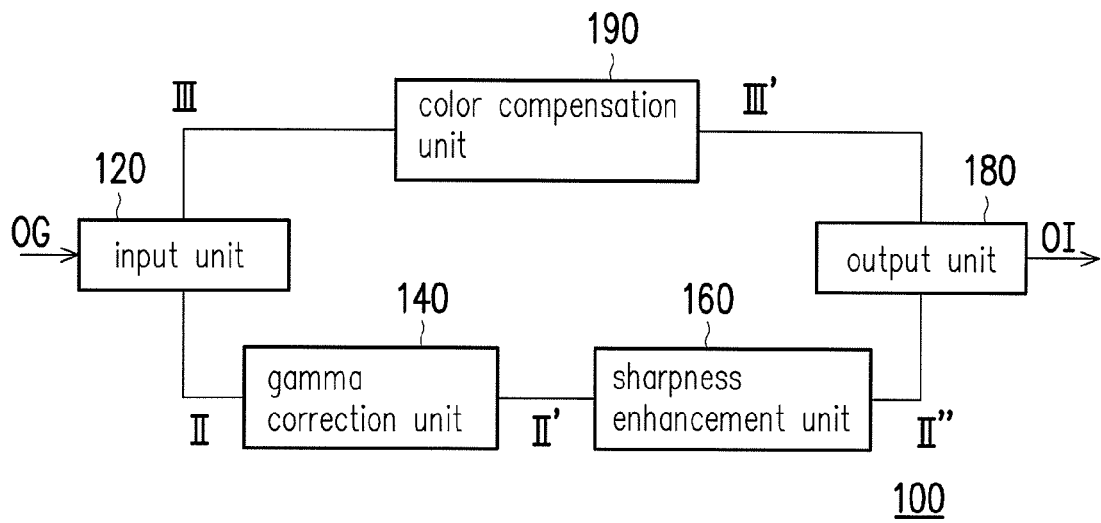
FIG. 1 illustrates a block diagram of an image processing apparatus according to an embodiment of the invention.

Reference will now be made in detail to the present embodiments of the invention, examples of which are illustrated in the accompanying drawings. Wherever possible, the same reference numbers are used in the drawings and the description to refer to the same or like parts. In addition, the specifications and the like shown in the drawing figures are intended to be illustrative, and not restrictive. Therefore, specific structural and functional detail disclosed herein are not to be interpreted as limiting, but merely as a representative basis for teaching one skilled in the art to variously employ the present invention.

FIG. 1 illustrates a block diagram of an image processing apparatus according to an embodiment of the invention. It should, however, be noted that this is merely an illustrative example and the invention is not limited in this regard. Referring to FIG. 1, the image processing apparatus 100 may perform gamma correction and sharpness enhancement on intensity components of an input image II, so as to generate an output image OI that can be displayed with low haze and high clarity. The image processing apparatus 100 may be an electronic device with an image processing feature such as a personal computer, a laptop computer, a tabular computer, a digital camera, a smart phone, a television, and so forth. The invention is not limited herein.

The image processing apparatus 100 includes an input unit 120, a gamma correction unit 140, a sharpness enhancement unit 160, an output unit 180 and a color compensation unit 190. It should be noted that, in the present invention, the input unit 120, the gamma correction unit 140, the sharpness enhancement unit 160, the output unit 180 and the color compensation unit 190 may be implemented by software medium and loaded by the processing unit of the image processing apparatus 100. The processing unit of the image processing apparatus 100 may be, for example, a central processing unit (CPU) or other programmable devices for general purpose or special purpose such as a microprocessor, a field-programmable gate array (FPGA), a digital signal processor (DSP), a programmable controller, an application specific integrated circuit (ASIC), a programmable logic device (PLD), other similar devices or a combination of aforementioned devices. However, the invention is not limited herein. In another embodiment of the present invention, the input unit 120, the gamma correction unit 140, the sharpness enhancement unit 160, the output unit 180 and the color compensation unit 190 may be implemented by practical circuit structure.

In an embodiment of the present invention, a display panel may be built in the image processing apparatus 100, but the present invention is not limited herein. In another embodiment of the present invention, the display panel may be separated from the image processing apparatus 100. The display panel may be, for example, the LC display panel, the PDLC display panel or the Surface Anchoring Liquid Crystal (SALC) display panel.

Figure 2:
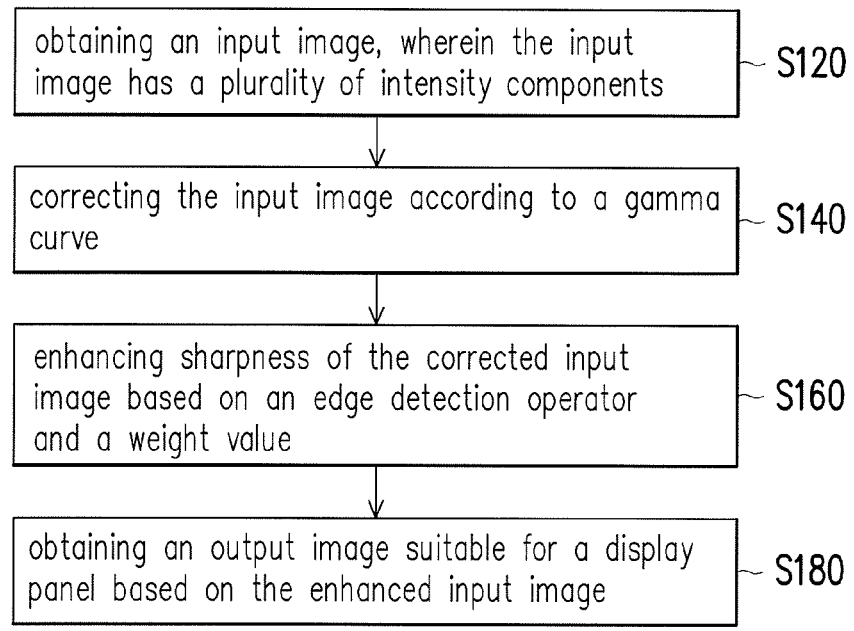
FIG. 2 illustrates a flowchart of an image enhancement method according to an embodiment of the invention

FIG. 2 illustrates a flowchart of an image enhancement method according to an embodiment of the invention, and the image enhancement method in FIG. 2 may be implemented by the image processing apparatus 100 in FIG. 1. The detailed steps of the image enhancement method are illustrated along with the components of the image processing apparatus in the embodiments hereinafter.

Referring to FIG. 1 and FIG. 2, within the image enhancement method, the input unit 120 first receives an original image OG, and the original image OG is further processed by the input unit 120 to obtain an input image II, wherein the input image II has a plurality of intensity components (Step 120). In the present embodiment, the image enhancement is mostly focus on the light intensity property of the input image II. Thus, it is better performed on the image defined in a Hue-Saturation-Intensity (HSI) color space, but the invention is not limited herein. Normally, the image defined in the HSI color space is usually more intuitive and perceptually relevant than the images defined in other color spaces.

Figure 3:
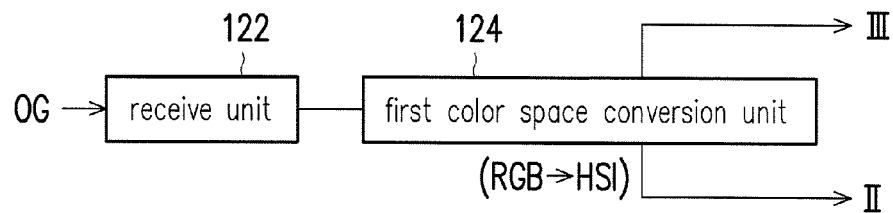
FIG. 3 illustrates a block diagram of an input unit according to an embodiment of the invention.

FIG. 3 illustrates a block diagram of an input unit according to an embodiment of the invention. Referring to FIG. 1, FIG. 2 and FIG. 3, the input unit 120 further includes the receive unit 122 and the first color space conversion unit 124. When the original image OG received by the receive unit 122 is not the HSI image, the first color space conversion unit 124 performs a first color space conversion to the original image OG to obtain the input image, wherein each of the pixels of the input image includes a hue component, a saturation component and the intensity component. In the present embodiment, the input unit 120 outputs the input image II composed of the intensity components to the gamma correction unit 140 based on the input image converted from the original image OG. In another embodiment of the present invention, the input unit 120 further outputs the input image III composed of the hue components and the saturation components based on the input image converted from the original image OG. The input image III may be received by the color compensation unit 190 or directly received by the output unit 180. The original image OG may be, for example, defined in a Red-Green-Blue (RGB) color space, such that each of the pixels includes a red component, a blue component and a green component. When converting the RGB image to the HSI image, the red components, the blue components and the green components of the pixels are utilized for obtaining the hue components, the saturation components and the intensity components of the input image. In another embodiment of the present application, when the original image OG received by the receive unit 122 is the HSI image, the original image OG is then treated as the input image, and the first color space conversion unit 124 does not perform the first color space conversion to the original image OG.

Referring to FIG. 1 and FIG. 2 again, after the input image II is obtained, the gamma correction unit 140 coupled to the input unit 120 receives the input image II and corrects the input image II according to a gamma curve (Step S140). To be more specific, the gamma correction is performed to adjust the relationship between the actual perceived brightness and the light intensity component. In the present application, the gamma value is selected to be 2.2, and the intensity components of the input image II are corrected according to the corresponding gamma curve. After correction, the grayscale variation of the corrected input image II' is more corresponding to the perception of human on different light intensities.

Referring to FIG. 1 and FIG. 2 again, after the gamma correction, the corrected input image II' is transmitted to the sharpness enhancement unit 160. The sharpness enhancement unit 160 coupled to the gamma correction unit 140 enhances the sharpness of the corrected input image II' based on an edge detection operator and a weigh value (Step S160). To be more specific, the sharpness enhancement unit 160 applies the edge detection and enhancement technique to improve the edge contrast of the corrected input image II', so as to enhance the sharpness of the corrected input image II'. It should be noted that, the sharpness enhancement is performed by the sharpness enhancement unit 160 on the light intensity components of the corrected input image II'.

Figure 4:
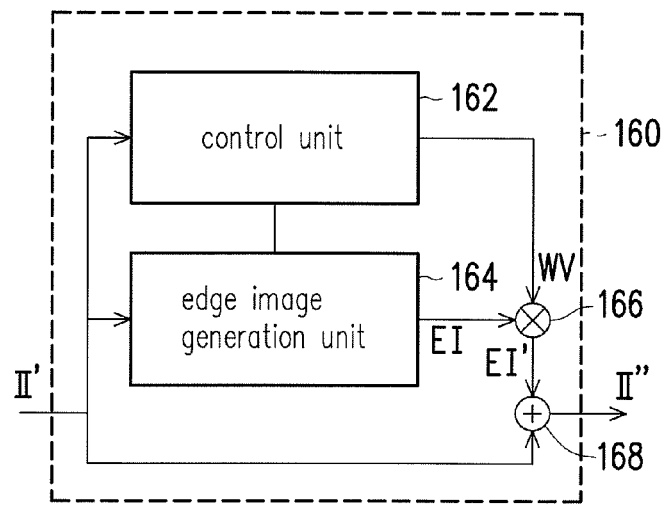
FIG. 4 illustrates a block diagram of a sharpness enhancement unit according to an embodiment of the invention.

FIG. 4 illustrates a block diagram of a sharpness enhancement unit according to an embodiment of the invention. Referring to FIG. 1, FIG. 2 and FIG. 4, the sharpness enhancement unit 160 includes a control unit 162, an edge image generation unit 164, a weight unit 166 and an overlay unit 168. The control unit 162 receives the corrected input image II' and determines the type and the size of the edge detection operator and the weight value WV according to image content of the corrected input image II' and environmental factors. It should be noted that, the degree of the sharpness may be controlled through the selection of the type and the size of the edge detection operator and the weight value WV.

The selection on the size of the edge detection operator will affect the computation performance of the electronic apparatus 100. When the size of the edge detection operator is larger, the computation speed on the edge detection and enhancement is lower, but the result of the edge detection and enhancement is usually better. To strike the balance, in the present embodiment, the edge detection operator is usually chosen to be a 3 by 3 operator matrix by the control unit. In other words, the size of the edge detection operator is 3×3. Further, for normal image, the type of the edge detection operator may be selected to be the Laplacian operator, and one example of the edge detection operator is shown as below:

$$\frac{1}{9} \times \begin{bmatrix} -2 & -2 & -2 \\ -2 & 25 & -2 \\ -2 & -2 & -2 \end{bmatrix}. \qquad (1)$$

However, in another embodiment of the present invention, when the control unit 162 determines that the image content of the corrected input image II' includes the background noise, then the edge detection operator that can simultaneously achieve the smoothing, the edge detection, and the edge enhancement is chosen by the control unit 162. One example of such edge detection operator is shown as below:

$$\frac{1}{8} \times \begin{bmatrix} -1 & -1 & -1 \\ -1 & 16 & -1 \\ -1 & -1 & -1 \end{bmatrix}. \qquad (2)$$

Moreover, the environmental factors such as the intensity of the ambient light and the type of the display panel for displaying the output image also play the important roles in determining and setting the edge detection operator by the control unit 162. The range of the weight value WV is between 2 to 3, and the actual weight value WV is also determined according to the image content of the corrected input image II' and the environmental factors. In the present embodiment, when the corrected input image II' is the normal image and the type of the display panel for displaying the output image is the transparent display panel, the weight value WV is determined to be 2.

Referring to FIG. 1, FIG. 2 and FIG. 4 again, after the edge detection operator is obtained, the edge image generation unit 164 coupled to the control unit 162 performs an edge detection process to the corrected input image II' by the edge detection operator to generate an edge image EI. To be more specific, by performing the edge detection process, the edge image generation unit 164 retrieves the edge regions from the corrected input image II', and thus generates the edge image EI. The weight unit 166 coupled to the edge image generation unit 164 and the control unit 162 further improves the edge image EI according to the weight value WV to obtain the improved edge image EI'. For example, the weight unit 166 improves the intensity of the edge regions of the corrected input image II' through multiplying the edge image EI by the weight value WV. At last, the overlay unit 168 coupled to the weight unit 166 receives the corrected input image II' and the improved edge image EI' and overlays the corrected input image II' with the improved edge image EI' to enhance the sharpness of the corrected input image II'. The enhanced input image II'' will lead to the better recognizability and vividness on display effect.

Figure 5:
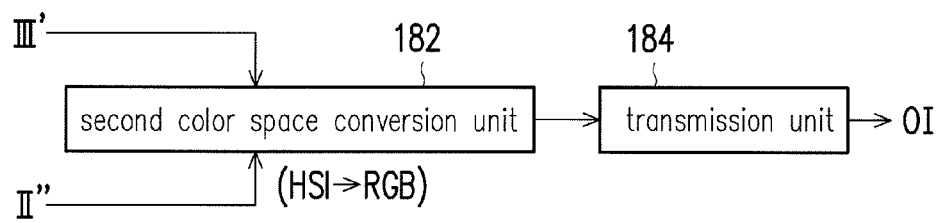
FIG. 5 illustrates a block diagram of an output unit according to an embodiment of the invention.

Referring to FIG. 1 and FIG. 2, after the input image II is corrected and the sharpness of the corrected input image II' is enhanced, the output unit 180 coupled to the sharpness enhancement unit 160 receives the enhanced input image II'' and obtains the output image OI suitable for the display panel based on the enhanced input image II'' (Step S180). FIG. 5 illustrates a block diagram of an output unit according to an embodiment of the invention. Referring to FIG. 1, FIG. 2 and FIG. 5, the output unit 180 includes a second color space conversion unit 182 and a transmission unit 184. After receiving the enhanced input image II'', the second color space conversion unit 182 performs a second color space conversion to obtain the output image OI based on the intensity components of the enhanced input image II'', where the output image OI is the RGB image and each of the pixels of the output image OI includes a red component, a blue component and a green component. In an embodiment of the present invention, the output image OI is then transmitted to the display panel by transmission unit 184 of the image processing apparatus 100. It should be noted that, the RGB image may be directly utilized and displayed by the display panel.

It should be noted that, the intensity components of the enhanced input image II'' may be integrated with the hue components and the saturation components of the input image III for the second color space conversion to obtain the output image OI. However, the present invention is not limited herein. Referring to FIG. 1 and FIG. 2 again, in an embodiment of the present invention, the input unit 120 further transmits the input image III composed of the hue components and the saturation component to the color compensation unit 190. The color compensation unit 190 coupled between the input unit 120 and the output unit 180 receives the input image III from the input unit 120 and adjusts the hue components and the saturation components of the input image III to compensate the input image III. To be more specific, in the present embodiment, the hue components and the saturation components are adjusted to compensate the color deviation, so as to improve the performance of the output color. After the color compensation, the compensated input image III' is transmitted to the output unit 180. The output unit 180 integrates the intensity components of the enhanced input image II'' with the hue components and the saturation components of the compensated input image III' and performs the second color space conversion to obtain the output image OI. Moreover, in another embodiment of the present invention, a histogram unit (not illustrated) is further disposed in the image processing apparatus 100 and coupled between the gamma correction unit 140 and the sharpness enhancement unit 160. The histogram unit is responsible for performing the contrast adjustment on the corrected input image II' using the histogram of light intensity components.

Here, an embodiment of the present invention is provided. When the display panel for displaying the output image is the SALC display panel, in the image processing apparatus 100, the gamma value is selected to be 2.2, the edge detection operator is chosen to be the 3 by 3 operator matrix, the type of the edge detection operator is selected to be the Laplacian operator, the weight value is set to be 2, and the saturation components are further set to be 30%. Under such configuration, the haze on the displayed image is reduced, and the display quality on the display panel is improved.

Based on the above, in the image enhancement method and the image processing apparatus thereof provided in the present invention, the light intensity component of the input image is corrected according to the gamma curve and the sharpness of the corrected input image is further enhanced. The edge detection operator and the weight value are determined according to the image content and the environmental factor and applied in accurately enhancing the sharpness of the corrected input image. After the image enhancement, the output image suitable for the display panel is obtained based on the enhanced input image. Thus, the displayed image shown by the display panel is more vivid and has better recognizability, and the haze on the displayed image is reduced.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. An image enhancement method, adapted to an image processing apparatus, the image enhancement method comprising:
   obtaining an input image, wherein the input image has a plurality of intensity components;
   correcting the input image according to a gamma curve;
   enhancing sharpness of the corrected input image based on an edge detection operator and a weight value; and
   obtaining an output image suitable for a display panel based on the enhanced input image,
   wherein when the corrected input image is a normal image, the edge detection operator is shown as $$\frac{1}{9} \times \begin{bmatrix} -2 & -2 & -2 \\ -2 & 25 & -2 \\ -2 & -2 & -2 \end{bmatrix},$$

when image content of the corrected input image includes background noise, the edge detection operator is shown as $$\frac{1}{8} \times \begin{bmatrix} -1 & -1 & -1 \\ -1 & 16 & -1 \\ -1 & -1 & -1 \end{bmatrix}.$$

2. The image enhancement method according to claim 1, further comprising:
   adjusting hue components and saturation components of the input image to compensate the input image.

3. The image enhancement method according to claim 1, wherein the step of obtaining the input image further comprises:
   receiving an original image; and
   performing a first color space conversion to the original image to obtain the input image, wherein each of pixels of the input image includes a hue component, a saturation component and the intensity component.

4. The image enhancement method according to claim 1, wherein the step of enhancing the sharpness of the corrected input image further comprises:
   determining a type and a size of the edge detection operator and the weight value according to an image content of the corrected input image and an environmental factor;
   performing an edge detection process to the corrected input image by the edge detection operator to generate an edge image;
   improving the edge image according to the weight value; and
   overlaying the corrected input image with the improved edge image to enhance the sharpness of the corrected input image.

5. The image enhancement method according to claim 1, wherein the step of obtaining the output image based on the enhanced input image further comprises:
   performing a second color space conversion to obtain the output image based on the intensity components of the enhanced input image, wherein each of pixels of the output image includes a red component, a blue component and a green component.

6. An image processing apparatus, comprising:
   an input unit, obtaining an input image, wherein the input image has a plurality of intensity components;
   a gamma correction unit, coupled to the input unit, correcting the input image according to a gamma curve;
   a sharpness enhancement unit, coupled to the gamma correction unit, enhancing sharpness of the corrected input image based on an edge detection operator and a weight value; and an output unit, coupled to the sharpness enhancement unit, obtaining an output image suitable for a display panel based on the enhanced input image, wherein when the corrected input image is a normal image, the edge detection operator is shown as $$\frac{1}{9} \times \begin{bmatrix} -2 & -2 & -2 \\ -2 & 25 & -2 \\ -2 & -2 & -2 \end{bmatrix},$$

when image content of the corrected input image includes background noise, the edge detection operator is shown as $$\frac{1}{8} \times \begin{bmatrix} -1 & -1 & -1 \\ -1 & 16 & -1 \\ -1 & -1 & -1 \end{bmatrix}.$$

7. The image processing apparatus according to claim 6, further comprising:
 a color compensation unit, coupled between the input unit and the output unit, adjusting hue components and saturation components of the input image to compensate the input image.

8. The image processing apparatus according to claim 6, wherein the input unit comprises:
 a receive unit, receiving an original image; and
 a first color space conversion unit, coupled to the receive unit, performing a first color space conversion to the original image to obtain the input image, wherein each of pixels of the input image includes a hue component, a saturation component and the intensity component.

9. The image processing apparatus according to claim 6, wherein the sharpness enhancement unit comprises:
 a control unit, determining a type and a size of the edge detection operator and the weight value according to an image content of the corrected input image and an environmental factor;
 an edge image generation unit, coupled to the control unit, performing an edge detection process to the corrected input image by the edge detection operator to generate an edge image;
 a weight unit, coupled to the edge image generation unit and the control unit, improving the edge image according to the weight value; and
 an overlay unit, coupled to the weight unit, overlaying the corrected input image with the improved edge image to enhance the sharpness of the corrected input image.

10. The image processing apparatus according to claim 6, wherein the output unit comprises:
 a second color space conversion unit, performing a second color space conversion to obtain the output image based on the intensity components of the enhanced input image, wherein each of pixels of the output image includes a red component, a blue component and a green component.

* * * * *